United States Patent [19]
Fujioka et al.

[11] 4,362,976
[45] Dec. 7, 1982

[54] DRIVING CIRCUIT FOR DC MOTOR

[75] Inventors: Yoshiki Fujioka, Hino; Yutaka Koiwai; Mitsuhiko Hirota, both of Tokyo, all of Japan

[73] Assignee: Fujitsu Fanuc Limited, Tokyo, Japan

[21] Appl. No.: 211,974

[22] Filed: Dec. 1, 1980

Related U.S. Application Data

[63] Continuation of Ser. No. 97,382, Nov. 26, 1979.

[30] Foreign Application Priority Data

Nov. 27, 1978 [JP] Japan .................. 53-146208

[51] Int. Cl.³ ................................. H02P 5/16
[52] U.S. Cl. .......................... 318/341; 318/434; 318/376; 363/57
[58] Field of Search .......... 318/318, 314, 341, 329, 318/373, 376, 434, 801, 762; 363/54, 57, 58, 129

[56] References Cited

U.S. PATENT DOCUMENTS

| | | | |
|---|---|---|---|
| 3,484,676 | 12/1969 | Wilkerson | 318/376 |
| 3,832,620 | 8/1974 | Pollard | 363/129 |
| 3,863,134 | 1/1975 | Pollard | 363/129 |
| 4,104,570 | 8/1978 | Hamby et al. | 318/318 |
| 4,153,863 | 5/1979 | Schachte et al. | 318/318 |

Primary Examiner—David Smith, Jr.
Attorney, Agent, or Firm—Staas & Halsey

[57] ABSTRACT

Disclosed is a DC motor drive circuit adapted to prevent thyristor commutation failure when a thyristor-controlled three-phase full-wave reversible bridge undergoes a transition in operating mode from a power inversion mode to a power rectification mode. The drive circuit includes a thyristor-controlled three-phase full-wave reversible bridge whose firing phase is controlled in accordance with a speed deviation between the actual speed of a DC motor and a command speed, polarity discrimination means for discriminating the polarity of the speed deviation, firing phase narrowing means operable in the power inversion mode to narrow the thyristor firing phase down to a minimum firing phase due to a reversal in the polarity of the speed deviation, detection means for detecting an intermittence in armature current, and blocking means for blocking firing of the three-phase thyristor-controlled inverter for a prescribed period of time when the intermittence of the armature current has been detected, the operation mode of the inverter being changed over from the power inversion mode to the power rectification mode after the lapse of said prescribed time period.

13 Claims, 12 Drawing Figures

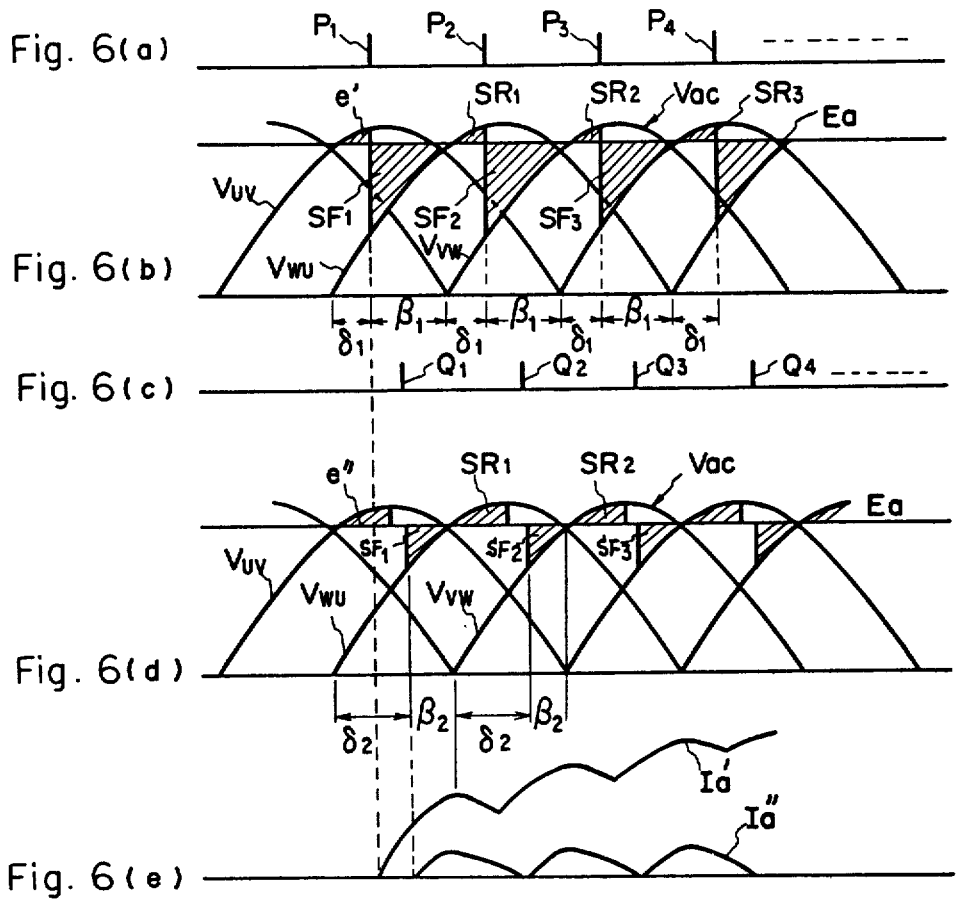
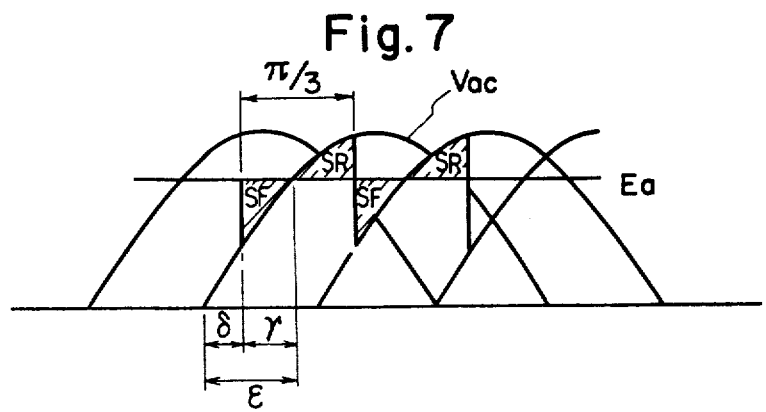

4,362,976

DRIVING CIRCUIT FOR DC MOTOR

This is a continuation of application Ser. No. 97,382 filed Nov. 26, 1979.

BACKGROUND OF THE INVENTION

1. Field of the Invention

This invention relates to a DC motor drive circuit, and more particularly to a DC motor drive circuit which prevents commutation failure in a permanent magnet-type DC motor driven by a thyristor-controlled three-phase full-wave reversible bridge system.

2. Description of the Prior Art

There is at present a demand for a drive circuit which can drive a permanent magnet-type DC motor at a high efficiency by causing armature current to decrease with respect to demand output, this decrease in armature current being accomplished by driving the motor so as to generate a high armature voltage.

The speed of a DC motor is varied by changing the applied DC voltage, and reversing the polarity of the applied DC voltage causes the motor reverse rotation. In conventional practice, a thyristor-controlled three-phase full-wave reversible bridge system is employed to drive a DC motor which is required to be rotated at any optional speed and in both the forward and reverse directions, the bridge system accomplishing this merely by controlling the applied voltage and its directionality. The bridge system is of the type composed of a forward thyristor-controlled bridge for supplying the DC motor armature with a forward current, and a reverse thyristor-controlled bridge for supplying the armature with a reverse current, the two bridge system being connected in parallel with each other and in parallel with the armature. Six thyristors are used to construct each bridge system. The DC motor can be made to rotate in the forward direction by firing each thyristor in the forward thyristor-controlled bridge at a suitable timing to allow the forward bridge to supply the motor armature with a forward current, whereas the motor is stopped by regenerative braking and then made to rotate in the reverse direction by firing each thyristor in the reverse thyristor-controlled bridge at a suitable timing to permit the reverse bridge to supply the motor armature with a reverse current. In addition, controlling the firing angle of each thyristor varies the voltage impressed upon the armature and thus permits variation of motor speed. This is referred to as a static Ward-Leonard speed control system.

In general, speed control of a DC motor using the abovesaid bridge proceeds in the following manner. In brief, the deviation between the actual speed and a command speed is computed, and the firing angle of the thyristors is controlled to reduce this deviation to zero. More specifically, the firing angle of the thyristors that construct the forward thyristor-controlled bridge is advanced or retarded in accordance with the value of the speed deviation if the command signal tends toward the forward direction, and similarly the firing angle of the thyristors in the reverse thyristor-controlled bridge is advanced or retarded in accordance with the value of the speed deviation if the command signal tends toward the reverse direction. This control operation varies the voltage impressed upon the DC motor to raise or lower its speed, the motor thus being controlled at 11 times so as to rotate according to a prescribed speed deviation derived from the command speed.

On the other hand, if under this speed control the command speed is to be changed abruptly with the DC motor rotating in the forward direction according to the prescribed speed deviation from the command speed, the speed control operation proceeds in the following manner. It will first be assumed that the command speed is reduced in an abrupt manner. The operating mode of the foregoing bridge system prior to the change in the command speed is the power rectification mode in which the forward thyristor-controlled bridge delivers a forward current to the armature to effect the speed control as described above. After the reduction in the command speed the operating mode shifts to a power inversion mode in which a reverse current, i.e., a braking current, is fed back via the reverse thyristor-controlled bridge to the power source owing to the armature voltage, whereby the speed of the DC motor is quickly reduced until it coincides with the command speed. After the actual speed has reached the command speed the power rectification mode is restored. Thereafter, the firing angle of thyristors in the forward converter is controlled to rotate the DC motor, maintaining the deviation between the actual speed and command speed at a prescribed value.

The fact that the permanent magnet-type DC motor does not possess a field winding explains why its speed is reduced by the shift from the power rectification mode to the power inversion mode when the command speed is decreased. In other words, when seeking to reduce the speed of a DC motor having a field winding, a reverse armature current, namely a so-called braking current that is fed back to the power source, is caused to flow if the armature voltage is made higher than the applied AC voltage by increasing the field current which flows into the field winding. This causes the speed of the DC motor to decrease rapidly and is known as regenerative braking. It follows that a permanent magnet-type DC motor is reduced in speed by the reverse current (braking current) which flows into the armature due to the shift from the power rectification mode to power inversion mode at the time the command speed is decreased.

No particular problem arises in the changeover from the power rectification mode to the power inversion mode, but there is a commutation failure in the thyristors of the reverse thyristor-controlled bridge in the changeover from the power inversion mode to the power rectification mode. In particular, this commutation failure occurs when the armature voltage is higher than the AC supplied voltage, as in the case where the permanent magnet-type DC motor is rotated at high speed in order to drive it at a low current and a high efficiency. When thyristor commutation failure induces an excessive braking current in the armature, the commutator portion of the DC motor is damaged, and the permanent magnet is demagnetized. Moreover, the commutation failure does not allow a thyristor to be turned off and a short-circuit is caused. In this case an over-current accident such as a blown fuse occurs.

SUMMARY OF THE INVENTION

The present invention discloses a drive circuit capable of preventing thyristor commutation failure in a permanent magnet-type DC motor drive circuit comprising a thyristor-controlled three-phase full-wave reversible bridge system.

It is therefore an object of the present invention to provide a DC motor drive circuit for preventing thyristor commutation failure when the operating mode of a thyristor-controlled three-phase full-wave reversible bridge system, which bridge system drives a DC motor, is changed over from a power inversion operating mode to a power rectification operating mode.

It is another object of the present invention to provide a drive circuit capable of driving the DC motor in a highly efficient manner with high armature voltage and low armature current.

Other features and advantages of the invention will be apparent from the following description taken in conjunction with the accompanying drawings.

BRIEF DESCRIPTION OF THE DRAWINGS

FIGS. 6(a) through (3) are waveform diagrams useful in explaining a reverse conversion operation at a time of high DC voltage;

FIG. 7 is a waveform diagram useful in explaining the minimum firing angle which does not give rise to commutation failure;

DESCRIPTION OF THE PREFERRED EMBODIMENTS

Figure 1:
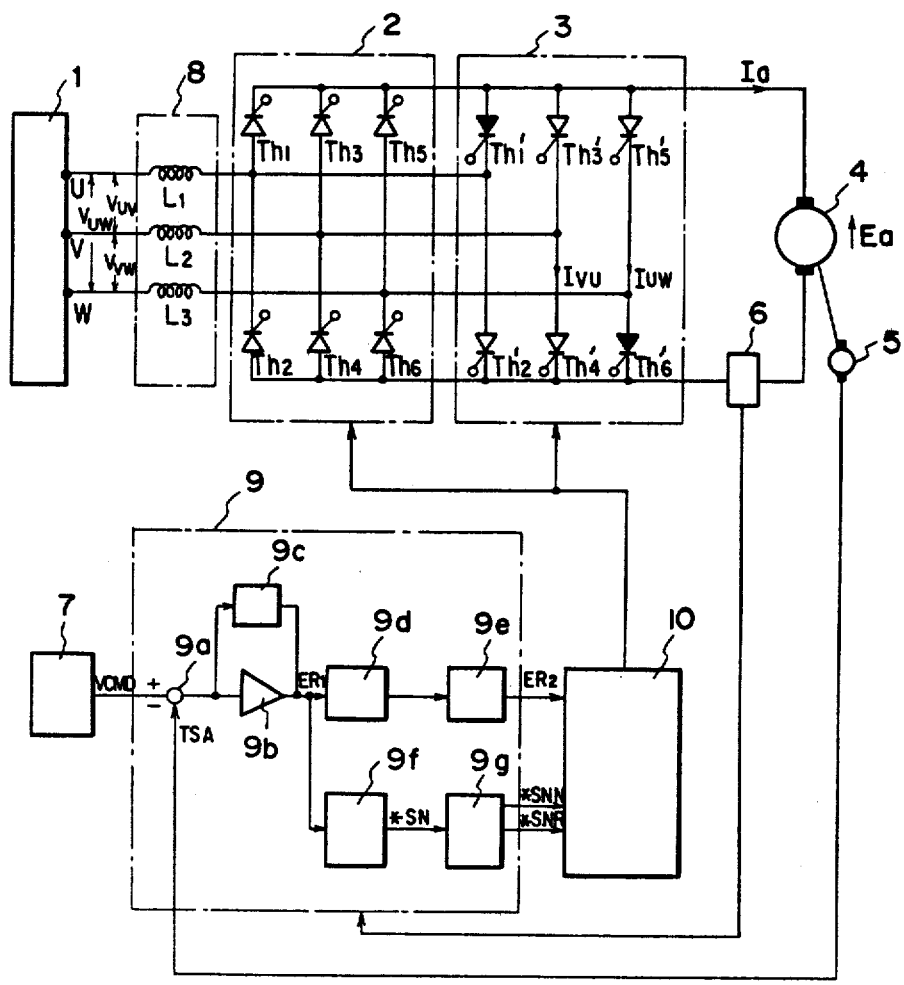
FIG. 1 is a block diagram of a DC motor drive circuit according to the prior art.
Figure 2:
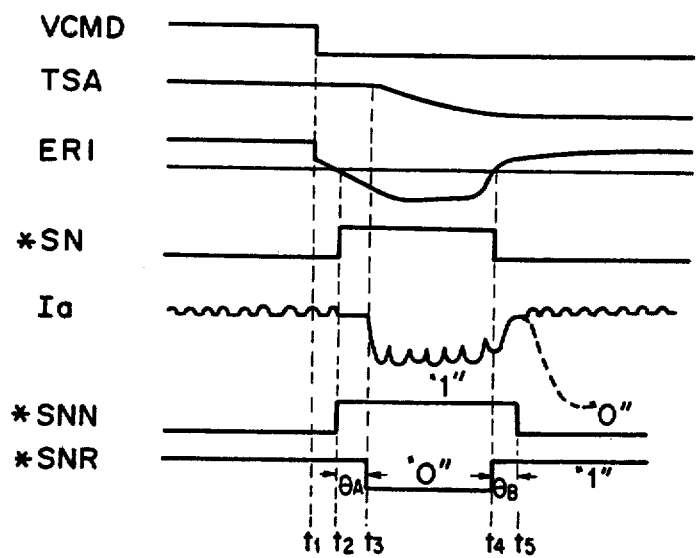
FIG. 2 is a diagram showing the waveforms associated with the drive circuit of FIG. 1.

Reference is first had to FIGS. 1 and 2 which show a block diagram of, and the waveforms associated with, a conventional drive circuit for a permanent magnet-type DC motor. The system includes a three-phase AC power source 1, a forward thyristor-controlled bridge 2 composed of six thyristors $Th_1$ through $Th_6$ whose firing angle is controlled to convert the three-phase AC voltage into DC voltage and supply a forward current to a DC motor to rotate the motor in the forward direction, and a reverse thyristor-controlled bridge 3 composed of six thyristors $Th_1'$ through $TH_6'$ as is the converter 2, whose firing angle is controlled to convert the three-phase AC voltage into DC voltage and supply a reverse current to the DC motor to rotate the motor in the reverse direction. The operating mode in which the forward thyristor-controlled bridge 2 or reverse thyristor-controlled bridge 3 converts the three-phase AC voltage $V_{UV}$, $V_{VW}$, $V_{WU}$ into DC voltage and supplies this DC voltage to the DC motor is referred to as the power rectification mode, while the operating mode in which the DC motor armature current is converted into three-phase AC current and fed back to the power source 1 is referred to as the power inversion mode. In other words, when the DC motor is rotating in the forward or reverse direction at a constant speed, bridge 2 or bridge 3 is operating in the power rectification mode. On the other hand, if the motor is rotating in, say, the forward direction at a constant speed and the command speed is then reduced, firing of the forward bridge 2 is inhibited and the firing angle of the reverse bridge 3 is controlled and operated in the power inversion mode. This operation makes the the DC motor armature voltage higher than the input AC voltage, causing a reverse or braking current to flow through the armature so that the speed of the DC motor arrives at the command speed in a short period of time. Thereafter the firing of the reverse bridge 3 is inhibited and the forward bridge 2 is fired for operation in the power rectification mode.

The system further includes a permanent magnet-type DC motor 4, a tachogenerator 5 mounted directly on the DC motor shaft and adapted to generate a signal TSA whose voltage is proportional to the speed of DC motor 4 and therefore indicative of the actual motor speed, a current detector 6 for detecting armature current $I_A$, a speed command circuit 7 for producing a speed command signal VCMD whose voltage is proportional to the command speed, an AC reactor 8 having inductors $L_1$ through $L_3$ for absorbing noise generated in each power line at the time of commutation, a speed control circuit 9, and a well-known phase control circuit 10 for controlling the firing phase of the thyristors $Th_1$ through $Th_6$ and $Th_1'$ through $Th_6'$ that construct the forward and reverse thyristor-controlled bridge 2 and 3, respectively.

The speed control circuit 9 includes an adder 9a for computing speed deviation from the command speed VCMD and actual speed TSA, an error amplifier 9b for producing a speed deviation signal $ER_1$ upon amplifying the output of the adder 9a, a phase compensation circuit 9c for compensating the phase of the speed deviation signal $ER_1$, an absolute value circuit 9d for producing an output which represents the absolute value of the speed deviation signal $ER_1$, a level shifting circuit 9e for shifting the level of the absolute value of the speed deviation signal $ER_1$, a direction discrimination circuit 9f for producing a direction signal *SN upon discriminating whether the speed deviation signal $ER_1$ is positive or negative, and a latch circuit 9g for producing firing control signals *SNN, *SNR which indicate, on the basis of the direction signal *SN, either firing control of the forward bridge 2 in the power rectification mode or firing control of the reverse bridge 3 in the power inversion mode.

The operation of the circuit shown in FIG. 1 will now be described with reference to the waveforms depicted in FIG. 2.

If the instructed direction of rotation is forward, the firing of the thyristors $Th_1$ through $Th_6$ in the forward bridge 2 is controlled at a suitable timing to generate a DC voltage which is applied to DC motor 4 to rotate the motor in the forward direction. The actual speed of motor 4 is detected by the tachogenerator 5 which delivers a corresponding signal TSA to the adder 9a.

The adder 9a, since it is also receiving the speed command signal VCMD, computes the difference between the actual speed signal TSA and the speed command signal VCMD and delivers a signal representative of this difference to the error amplifier 9b and phase compensating circuit 9c so that it is amplified by the error amplifier while undergoing a phase compensation, thereby to form a speed deviation signal $ER_1$. The absolute value circuit 9d takes the absolute value of speed deviation signal $ER_1$ and feeds it through the level shifting circuit 9e for delivery to phase control circuit 10 as a final speed deviation signal $ER_2$. The speed deviation signal $ER_1$ is also applied to direction discrimination circuit 9f which decides whether the actual DC motor speed TSA is higher or lower than the command speed VCMD, and then produces a direction signal *SN based on the discrimination. This signal is converted by latch circuit 9g into firing control signals *SNN, *SNR. The forward thyristor-controlled bridge 2 is subjected to firing control in the power rectification mode of operation when the firing control signal *SNN is at logic "0", whereas the reverse thyristor-controlled bridge 3 is subjected to firing control in the power inversion mode of operation when firing control signal *SNR is at logic "0".

When *SNN is at logic "0", the phase control circuit 10 in accordance with the speed deviation signal $ER_2$ is operable to advance or delay the firing angle of each thyristor $Th_1$ through $Th_6$ in the forward bridge 2 so as to make the actual speed TSA agree with the command speed VCMD. This speed control operation is repeated, so that the DC motor 4 will continue rotating normally while maintaining a prescribed speed deviation from the command speed VCMD.

Let it now be assumed that the command speed signal VCMD decreases abruptly at time $t_1$ shown in FIG. 2. This causes a drop in the speed deviation signal $ER_1$ whose value reverses polarity at time $t_2$, whereby the direction discrimination circuit 9f produces a direction signal *SN at logic "1". When direction signal *SN goes to logic "1", latch circuit 9g raises firing control signal *SNN to logic "1" (when *SNN is at logic "0" the forward bridge 2 is subjected to firing control in the power rectification mode), and lowers firing control signal *SNR to logic "0" (the logic value at which the reverse bridge 3 is subjected to firing control in the power inversion mode) at time $t_3$ after a time lapse $\theta_A$. This interval $\theta_A$ which shall be referred to as the gate blocking time is a period over which the firing of the forward and reverse bridges 2,3 will be inhibited. At time $t_3$ the mode of operation will therefore shift from the power rectification mode which relies upon the forward bridge 2 to the power inversion mode which relies upon the reverse bridge 3, with the result that the armature current Ia flowing through the armature of the DC motor 4 will reverse and flow in the opposite direction. This reversed armature current Ia serves as a braking current to rapidly reduce the actual motor speed TSA. The actual speed TSA becomes equivalent to the command speed VCMD at time $t_4$, after which the speed deviation signal $ER_1$ returns to its original polarity. In consequence, the direction signal *SN, which is the output signal of direction discrimination circuit 9f, goes to logic "0" at the time $t_4$. Latch circuit 9g is responsive to this transition to restore firing control signal *SNR to logic "1", and firing control signal *SNN to logic "0" at time $t_5$ after a time lapse $\theta_B$. This interval $\theta_B$ is a gate blocking interval similar to the aforesaid $\theta_A$ and is a period over which the firing of the forward and reverse bridges 2,3 is inhibited. Accordingly, at time $t_5$ the mode of operation is shifted from the power inversion mode relying upon reverse bridge 3 to the power rectification mode relying upon forward bridge 2. The result is that a forward armature current Ia will flow through the armature, after which the DC motor 4 will rotate maintaining a prescribed speed deviation from a new command speed.

It is to be noted that the armature voltage is high when the permanent magnet-type DC motor 4 is rotating at high speed. This means that commutation failure will occur if a large current is flowing in the armature at the time of transition from the power inversion mode to the power rectification mode. This commutation failure can lead to a variety of problems. For example, in a situation where the thyristors $Th_1'$ and $Th_6'$ of the reverse bridge 3 have been subjected to firing control in the power inversion mode so that the braking current Ia is flowing in the armature, the thyristors $Th_1'$ and $Th_6'$ will remain on if a commutation failure occurs at the time of the transition from the power inversion mode to the power rectification mode which relies upon the forward bridge 2. A large current will therefore flow into the armature through the thyristors $Th_1'$, $Th_6'$. The peak value of this voltage is equivalent to the sum of the armature voltage Ea and the peak value of the three-phase AC voltage, while its frequency is equivalent to that of the three-phase AC voltage. As a result, there is a sharp increase in the armature current (braking current) $I_A$ flowing in the opposite direction. This can damage the commutator portion of the permanent magnet-type DC motor 4 and demagnetize the magnet. Moreover, if thyristor $Th_3'$ and thyristor $Th_2'$ are fired subsequently under a condition wherein the commutation failure has occurred when the thyristors $Th_1'$ $Th_6'$ are on, thyristors $Th_1'$ and $Th_2'$ will be short-circuited, leading to an overcurrent accident.

It is possible to conceive of two conditions under which such commutation failure will not occur. (1) Firing of the forward bridge 2 and reverse bridge 3 is inhibited during the gate blocking interval $\theta_B$ prior to the transition from the power inversion mode to the power rectification mode. However, unless the value of the current flowing through a firing thyristor is reduced by sufficiently narrowing the firing phase of the reverse bridge 3 before the gate blocking operation, the thyristor cannot be turned off. In other words, commutation failure occurs. In general, therefore, firing phase is narrowed before the gate blocking operation. But if the firing phase is narrowed excessively, the overlapping angle of thyristor commutation assumes a large value in a case where the armature current is large, thus giving rise to an insufficient commutation margin phase angle that will cause commutation failure when the mode of operation is converted. Thus, one condition for obviating commutation failure entails reducing the current flowing through the thyristor to be turned off by narrowing sufficiently the firing phase angle while maintaining a sufficient commutation margin angle prior to the gate blocking operation. (2) From condition (1) it is understood that the current flowing through the firing thyristor must be reliably reduced by sufficiently narrowing the firing phase angle prior to the transition from the power inversion mode which relies upon the reverse bridge 3 to the power rectification mode which relies upon the forward converter 2. However, it should be noted that although the firing phase is narrowed to a predetermined firing phase angle to reduce the current to an intermittent current condition when the three-phase input power is balanced and the waveform of the applied voltage is free of distortion, there is a case where the current will not attain the value of the intermittent condition at the aforesaid firing phase, namely, when the three-phase input power is unbalanced and the applied voltage waveform distorted. Commutation failure will be the result. Thus, another condition for obviating commutation failure involves consideration of an imbalance in the three-phase AC power source as well as distortion in the three-phase AC voltage waveform. The armature current Ia should be interrupted for a prescribed number of firing pulses and the gate blocking operation should be applied upon detecting that the intermittent current level has been attained. Furthermore, let it be assumed, for example, that pairs of thyristors Th$_1'$ and Th$_6'$, Th$_6'$ and Th$_3'$, Th$_2'$ and Th$_3'$ are to be turned on sequentially when the mode of operation is the power inversion mode. Then, narrowing the firing phase prior to the conversion of the operating mode, the current flowing through thyristors Th$_1'$, Th$_6'$ when these thyristors are on is reduced from the prescribed value to intermittent current. Subsequently, and in a similar manner, the current flowing through thyristors Th$_6'$, Th$_3'$ when these have been turned on is reduced from the prescribed value to intermittent current, as is the current flowing through thyristors Th$_2'$, Th$_3'$ when they have been turned on. Commutation failure will not occur if the gate blocking operation is applied upon detecting that the current (armature current) has successively been reduced to intermittent current three times. Since the phase control circuit 10 produces six firing pulses for each period of the three-phase AC voltage, if this voltage has a frequency of 50 Hz (a period of 20 msec.), the gate blocking operation should be applied upon detecting that the armature current Ia has been interrupted three times over an interval of 10 msec (that is 20/6×3 msec) or the gate blocking operation may simply be applied at the lapse of 10 msec after detection of the first intermittent armature current.

The relation between commutation overlapping angle and firing angle will now be described in detail in the case of the condition (1), with reference being had to FIGS. 3 and 4.

Figure 3:
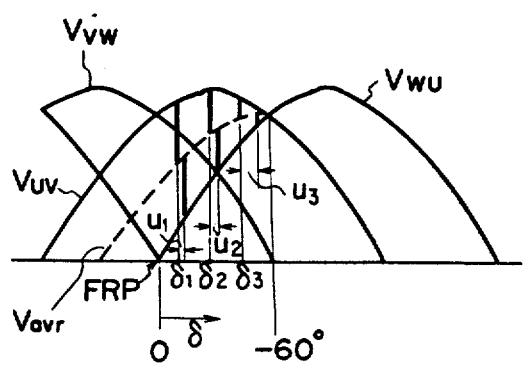
FIG. 3 is a diagram useful in explaining the relation between firing angle $\delta$ and commutation overlapping angle U for a case in which a thyristor-controlled three-phase full-wave reversible bridge system, is in a power inversion mode.

The diagram of FIG. 3 is useful in describing the relation between firing angle δ and commutation overlapping angle U for a case in which the reverse thyristor-controlled bridge 3 is operating in the power inversion mode. $V_{UV}$, $V_{VW}$ and $V_{WU}$ are the phase voltage waveforms of the respective phases of the three-phase AC voltage, and FRP represents a firing reference point.

It shall be assumed that a current is being supplied to the armature through thyristors Th$_1'$ and Th$_4'$ in the arrangement of FIG. 1, and that at this time thyristor Th$_6'$ is turned on and thyristor Th$_4'$ is turned off at a firing angle δ, so that the armature will thenceforth be supplied with a current from thyristors Th$_1'$ and Th$_6$. In other words, commutation from the V-U phase to the W-U phase will be considered. As thyristor Th$_6'$ is fired when the firing angle δis δ$_1$, the current I$_{VU}$ flowing through thyristors Th$_1'$, Th$_4'$ will begin to decrease, and the current I$_{UW}$ flowing through the thyristors Th$_1'$, Th$_6'$ will begin to increase. Then, after a prescribed time lapse following firing, namely at a point in time corresponding to an angle (δ$_1$+U$_1$), I$_{VU}$ becomes zero, after which only the current I$_{UW}$ applies as the armature current Ia. In other words, the V-U phase thyristors Th$_1'$, Th$_4'$ and W-U phase thyristors Th$_1'$, Th$_6'$ are on during the interval from the angle δ$_1$ to the angle (δ$_1$+U$_1$). The angle U$_1$ is referred to as the commutation overlapping angle. The voltage Vavr impressed upon the armature over this period is expressed by $(V_{VU}+V_{UV})/2$, and is indicated by the dotted line in FIG. 3. Since the slope of the rising or positive-going side of the voltage Vavr becomes gentler as it approaches the firing angle δ of −60 degrees, the commutation overlapping angles U$_1$, U$_2$, U$_3$ at the firing angles δ$_1$, δ$_2$, δ$_3$ are related by the inequality U$_1$<U$_2$<U$_3$. The size of the commutation overlapping angle is given by the following equation.

$$U = -\left(\frac{2\pi}{3} - \delta\right) + \cos^{-1}\left(\frac{2\pi}{3}\right) - \delta\right) - \sqrt{2}\, Ia \cdot X/Vac \right) \quad (1)$$

where Ia is the load (armature) current, Vac the AC input voltage, X the reactance on the AC input side, and δ the firing angle when the mode of operation is the power inversion mode.

Figure 4A:
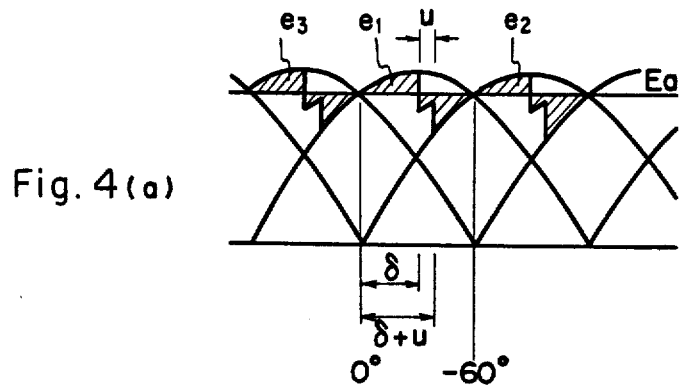
FIGS. 4(a) and (b) show respectively waveform diagrams of applied voltage and armature current for a case in which firing angle $\delta$ is within commutation limits.
Figure 4B:
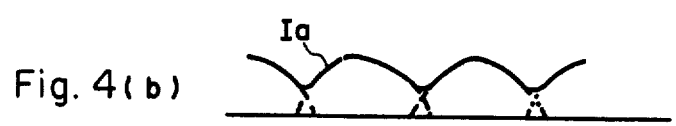

It can be understood from equation (1) that the commutation overlapping angle U is a function of the armature current Ia, power source voltage Vac, the power source capacity and the firing angle δ. In addition, 0 to −39 degrees is the range of the firing angle δ, in the power inversion mode, for passing maximum load current under a minimum input power source voltage at the rated power source capacity. A firing angle δ having a range between 0 and −36 degrees is preferable in view of the turn-off time of the thyristors. Illustrated in FIG. 4(a) are the waveforms of the voltage e$_i$ (1,2,3) (indicated by the hatched lines) impressed upon the armature, and in FIG. 4(b) is shown the armature current Ia, for a case where the firing angle δ in the power inversion mode of operation is within the commutation limits of 0 to −36 degrees. Shown in FIGS. 5(a) and (b) are the respective voltage and current waveforms for a case where the firing angle δ exceeds the commutation limits. Ea denotes the armature voltage. The current waveforms Ia', Ia", and Ia''' indicated in FIG. 5(b) by the one-dot chain line, solid line and broken line, respectively, are the armature currents resulting from the respective voltages e$_3$, e$_1$, e$_2$.

Figure 5A:
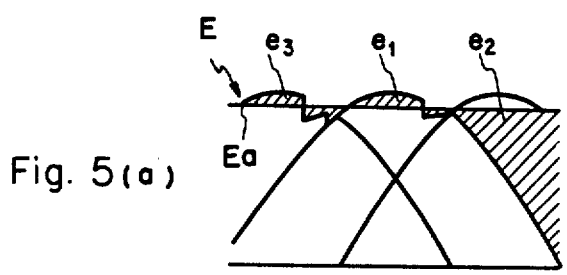
FIGS. 5(a) and (b) show respectively waveform diagrams of applied voltage and armature current for a case in which firing angle $\delta$ is outside commutation limits.
Figure 5B:
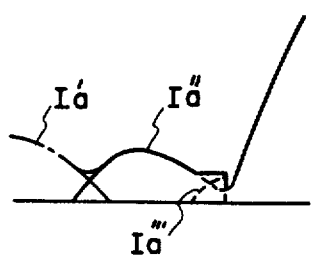

It can be understood from FIGS. 5(a) and (b) that the commutation failure is caused when the firing angle δ is outside the commutation limits. Accordingly, the firing angle must be limited to −36 degrees at most considering the overlapping angle U even if the thyristor firing phase is sufficiently narrowed at the time of the transition from the power inversion mode to the power rectification mode.

Reference will now be had to FIGS. 6(a) to (e) for a discussion of the aforesaid condition (2) relating to the prevention of commutation failure when changing over the operating mode. In concrete terms this condition for assuring commutation involves changing the armature current Ia from a continuous current to an intermittent current prior to the gate blocking operation in shifting from the power inversion mode relying on the reverse thyristors to the power rectification mode relying on the forward thyristors.

FIGS. 6(a) to (e) illustrate the power inversion mode of operation when the permanent magnet-type DC motor is rotating at high speed, namely at such time that a high armature voltage Ea is being generated. FIGS. 6(a) and (c) show trains of thyristor firing pulses, while FIG. 6(b) illustrates a voltage waveform representing the state of commutation when a thyristor is fired by pulses $P_1$ to $P_4$ shown in (a), or, more specifically, depicts a voltage waveform e' (hatched portion) that represents the state of commutation when the firing angle, as now expressed in terms of $\beta$ as illustrated, has been narrowed considerably to $\beta_1$. FIG. 6(d) depicts a voltage waveform when a thyristor is fired by firing pulses $Q_1$ to $Q_4$ shown in FIG. 6(c), or, more specifically, shows a voltage waveform e'' (hatched portion) that represents the state of commutation when the firing angle $\beta$ has been narrowed only slightly to $\beta_2$. FIG. 6(e) illustrates current waveforms Ia', Ia'' which correspond to the voltages e', e'', respectively.

With reference first to FIG. 6(b), $V_{UV}$, $V_{VW}$, $V_{WU}$ represent the respective voltage waveforms for the phases U-V, V-W, and W-U. The firing pulses $P_1$ to $P_4$ shown in FIG. 6(a) are applied sequentially to each thyristor of the reverse converter 3 when the firing angle is $\beta_1$ ($\beta_1$). $SF_1$, namely that conducting region of the thyristors that is located below the armature voltage Ea during the power inversion mode, represents the voltage source acting in a direction that increases the braking current Ia; and $SR_1$, namely that conducting region of the thyristors that is located above the armature voltage Ea, acts in a direction that suppresses the braking current. As a result, the current varies as shown by waveform Ia' in FIG. 6(e), in which the waveform rises, reaches a peak value, and then falls. It can be seen, however, that the current never falls to zero. When firing now occurs at a point where $B = B_1$ in the next firing phase, the current Ia' resulting from the voltage of region $SF_2$ is increased further but is decreased only slightly in the region $SR_2$. This action of increasing and then decreasing the current is repeated in similar fashion and results in an ever higher current level. Thus the current Ia' assumes the waveform shown in FIG. 6(e), the armature current being enlarged in a direction that fosters commutation failure. On the other hand, if firing is conducted sequentially by the firing pulses $Q_1$ to $Q_4$ shown in FIG. 6(c), the thyristors will fire in succession at a point where $\beta$ is equal to $\beta_2$ which is narrower than $\beta_1$. The current controlled by the voltage component of region $SF_1$ therefore assumes the waveform Ia'' of FIG. 6(e), in which the current is seen to rise to a peak value once and then drop to the zero level under the control of the $SF_1$ region voltage component. The current is therefore intermittent. Since each thyristor $Th_1'$ through $Th_6'$ of the reverse converter 3 is fired successively at points where the firing angle is $\beta_2$, the braking armature current will be rendered intermittent, never failing to reach the zero level through the process described above. Applying the gate blocking operation under these circumstances establishes the condition that permits the transition from the power inversion mode to the power rectification mode without commutation failure.

In accordance with the present invention, the change-over in the operating mode of the thyristor-controlled converters is effected after confirming three pulses which cause intermittent current. While this will be described in more detail later, let us now briefly consider conditions that will assure the intermittence of the current.

FIG. 7 depicts an operating waveform during the power inversion mode of the reverse converter 3 depicted in FIG. 1, and shows the operation when the back electromotive force (armature voltage) of the DC motor is Ea and the firing angle is $\delta$. The hatched portion SF represents a voltage component acting in a direction that increases regenerative current (braking current), while the portion SR designates a voltage component acting in a direction that suppresses the regenerative current. Thus it can be said that the condition for achieving an intermittent current is obtained when the areas of the hatched portions SF, SR are equal to each other or when the area of SR which acts to decrease the regenerative current is the greater, i.e., area SF $\leq$ area SR. This relation area SF $\leq$ area SR will hold at all times when the armature voltage Ea is in a low region, and thyristor commutation failure therefore will not occur. However, the relation will not necessarily hold when the armature voltage Ea is in a high region, so that commutation failure can be the result. It therefore follows that the essential condition for the avoidance of commutation failure involves establishing the relation area SF $\leq$ area SR when Ea is large. This means satisfying the following equations in terms of the AC input voltage Vac, back electromotive force Ea, and phase control angle $$SF = Ea(\epsilon - \delta) - \sqrt{2}\, Vac \int_{\delta}^{\epsilon} \sin\theta\, d\theta \quad (2)$$

and $$SR = \sqrt{2}\, Vac \int_{\epsilon}^{\delta + \pi/3} \sin\theta\, d\theta - Ea\left(\delta + \frac{\pi}{3} - \epsilon\right) \quad (3)$$

If area SF is set equal to area SR, we obtain the equations $$\pi/3 \times \frac{Ea}{\sqrt{2}\, Vac} = \sin(\delta + \pi/6) \quad (4)$$

and $$Ea = 3/\pi \times \sqrt{2}\, Vac \cdot \sin(\delta + \pi/6) \quad (5)$$

It can be understood from equation (5) that determining the input voltage Vac and the minimum phase angle will decide the upper limit of the armature voltage Ea capable of satisfying the condition that renders the current Ia intermittent in the power inversion mode. The maximum speed at which a permanent magnet-type DC motor is capable of running can therefore be set while effecting the change-over in operating mode without causing commutation failure.

The present invention while satisfying the condition described above narrows the firing angle of the thyristor-controlled converter in the power inversion mode down to a minimum firing angle (although the limit upon the minimum firing angle is theoretically −36 degrees, the set value is −30 degrees in view of the margin) when there is a change-over in the direction signal SN (refer to FIGS. 1 and 2), and applies the gate blocking operation after confirming for a period of three firing pulses that the armature current Ia has attained the intermittent state. After this has been achieved the change-over is made from the power inversion mode to the power rectification mode. In other words, if the three-phase input voltage has a frequency of 50 Hz (a period of 20 msec), the gate blocking operation is applied to both the forward and reverse converters 2, 3 after detecting that the armature current has been reduced to zero three times over an interval of 10 msec (20/6×3 msec), this following from the fact that six firing pulses are applied to the converters for each period of the above input voltage. Hence, the change-over in mode of operation takes place at a prescribed time before the gate blocking operation. The reason why the intermittent state of the current is confirmed for the period of three firing pulses (approximately 10 msec) is that it is necessary to positively detect this state in view of the fact that the current may lapse into a continuous state if the three-phase input power becomes unbalanced or develops a distorted waveform.

Figure 8:
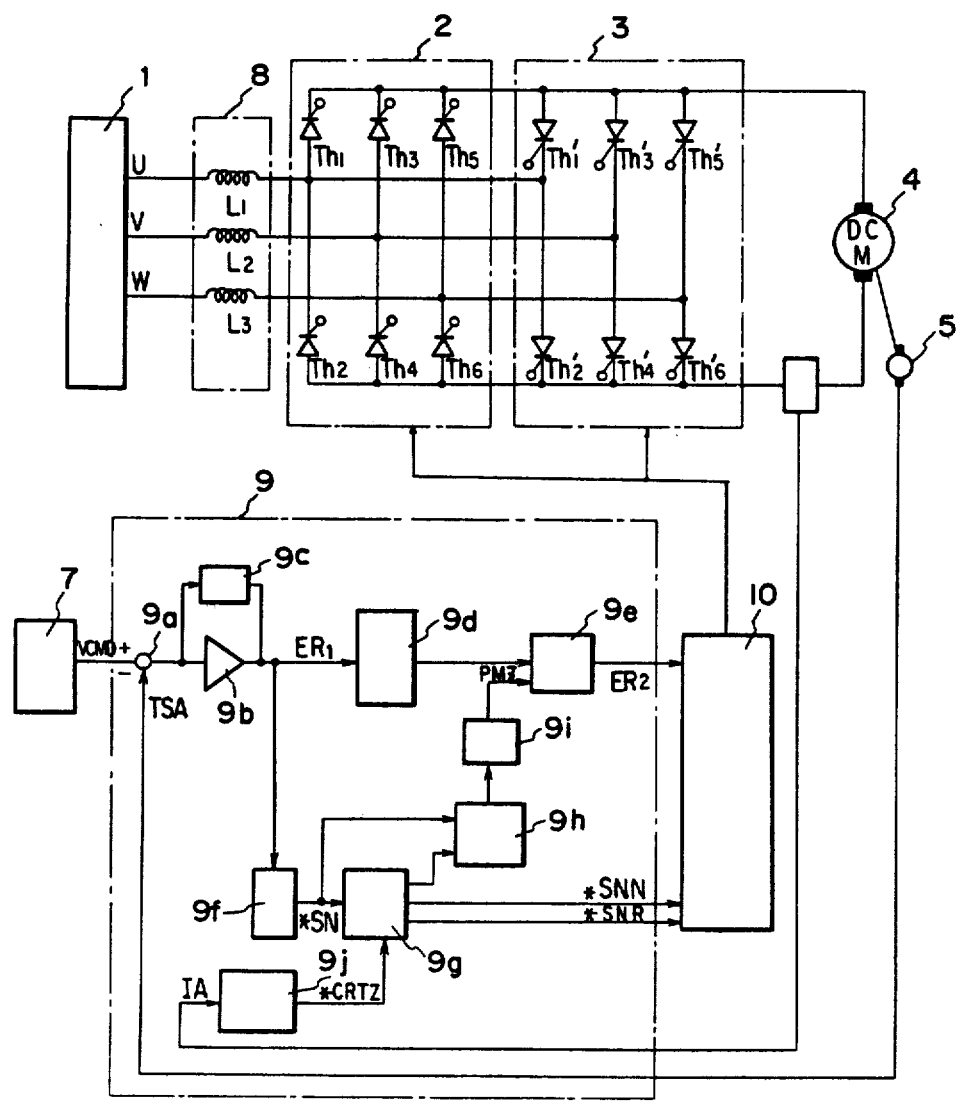
FIG. 8 is a block diagram of a DC motor drive circuit embodying the present invention.
Figure 9:
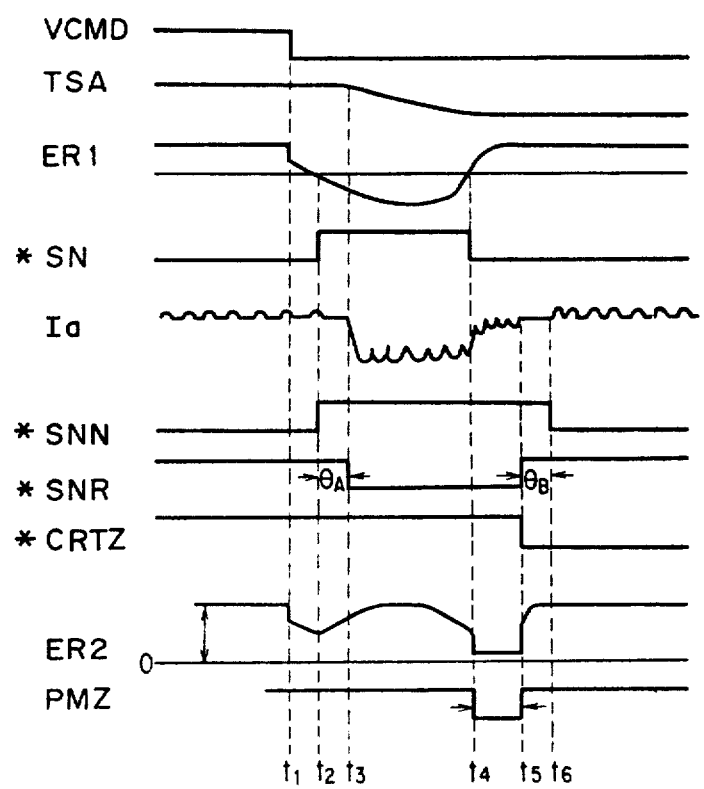
FIG. 9 is a diagram showing the waveforms associated with the circuit of FIG. 8.

A block diagram showing an embodiment of the present invention is illustrated in FIG. 8, while the waveforms associated therewith appear in FIG. 9. It should be noted that like reference numerals and characters designate components identical with or corresponding to those of FIG. 1 so that such components need not again be described in detail.

Turning now to FIG. 8, the circuitry in accordance with the present invention comprises an adder 9a, error amplifier 9b, phase compensating circuit 9c, absolute value circuit 9d, level shifting circuit 9e, direction discrimination circuit 9f, direction latch circuit 9g, direction conversion detecting circuit 9h, phase narrowing circuit 9i, and current intermittence detecting circuit 9j. A description of circuit operation will now follow.

If the instructed direction of rotation is forward, the firing of the thyristors $Th_1$ through $Th_6$ in the forward converter 2 is controlled at a suitable timing to generate a DC voltage which is applied to DC motor 4 to rotate the motor in the forward direction. The actual speed of motor 4 is detected by the tachogenerator 5 which delivers a corresponding signal TSA to the adder 9a. The adder 9a, since it is also receiving the speed command signal VCMD, computes the difference between the actual speed signal TSA and speed command signal VCMD and delivers a signal representative of this difference to the error amplifier 9b and phase compensating circuit 9c so that it is amplified by the error amplifier while undergoing a phase compensation, thereby to form a speed deviation signal $ER_1$. The absolute value circuit 9d takes the absolute value of speed deviation signal $ER_1$ and feeds it through the level shifting circuit 9e for delivery to phase control circuit 10 as a final speed deviation signal $ER_2$. The speed deviation signal $ER_1$ is also applied to direction discrimination circuit 9f which decides whether the actual DC motor speed TSA is higher or lower than the command speed VCMD, and then produces a direction signal *SN based on the decision. This signal is converted by direction latch circuit 9g into firing control signals *SNN, *SNR. The forward thyristor-controlled converter 2 is subjected to firing control in the power rectification mode of operation when the firing control signal *SNN is at logic "0", whereas the reverse thyristor-controlled converter 3 is subjected to firing control in the power inversion mode of operation when firing control signal *SNR is at logic "0".

When *SNN is at logic "0", the phase control circuit 10 in accordance with the speed deviation signal $ER_2$ is operable to advance or delay the firing angle of each thyristor $Th_1$ through $Th_6$ in the forward converter 2 so as to make the actual speed TSA agree with the command speed VCMD. This speed control operation is repeated, so that the DC motor 4 will continue rotating normally maintaining a prescribed speed deviation from the command speed VCMD.

Let it now be assumed that the command speed signal VCMD decreases abruptly at time $t_1$ shown in FIG. 9. This causes a drop in the speed deviation signal $ER_1$ whose value reverses polarity at time $t_2$, whereby the direction discrimination circuit 9f produces a direction signal *SN at logic "1". When direction signal *SN goes to logic "1", latch circuit 9g raises firing control signal *SNN to logic "1" (when *SNN is at logic "0" the forward converter 2 is subjected to firing control in the power rectification mode), and lowers firing control signal *SNR to logic "0" (the logic value at which the reverse converter 3 is subjected to firing control in the power inversion mode) at time $t_3$ after a time lapse $\theta_A$. This interval $\theta_A$ which shall be referred to as gate blocking time is a period over which the firing of the forward and reverse converters 2, 3 will be inhibited. At time $t_3$ the mode of operation will therefore shift from power rectification mode which relies upon the forward converter 2 to the power inversion mode which relies upon the reverse converter 3, with the result that the armature current Ia flowing through the armature of the DC motor 4 will reverse and flow in the opposite direction. This reversed armature current Ia serves as a braking current to rapidly reduce the actual motor speed TSA. After this reduction in the actual motor speed the armature current Ia serving as the braking current increases and the actual motor speed TSA becomes equal to the command speed VCMD at time $t_4$ which is also when the speed deviation $ER_1$ returns to its original polarity. In consequence, the direction signal *SN, which is the output of direction discrimination circuit 9f, goes to logic "0" at time $t_4$ so that both the direction conversion detecting circuit 9h and minimum phase narrowing circuit 9i are rendered operable. The phase narrowing circuit 9i therefore issues a phase narrowing signal pulse PMZ at logic "0", with the result that the final speed deviation $ER_2$ which decides the firing angle of the phase control circuit 10 is reduced to a level close to zero. When $ER_2$ has been reduced and the firing phase narrowed, the armature current Ia decreases and attains a value of zero three times by time $t_5$. The current intermittence detecting circuit 9j issues a signal *CRTZ at logic "0", indicative of intermittent current after detecting that the armature current Ia has become intermittent for the third time, and direction latch circuit 9g is responsive to the "0" logic level of signal CRTZ to reset the direction conversion detecting circuit 9h. As a result, the output signal PMZ of the phase narrowing circuit 9i goes to logic "1" at $t_5$ to effect a release from the phase narrowing operation. Hence, from time $t_5$ to time $t_6$, an interval which defines a gate blocking interval $\theta_B$, the firing angle control signal *SNR is raised to logic "1" to join the firing angle control signal *SNN at the same logic level, whereby firing of the forward and reverse converters 2, 3 is inhibited. The firing control signal *SNN then goes to logic "0" at time $t_6$ so that the forward converter 2 is operated in the power rectification mode, after which control is effected such that the DC motor will rotate while the prescribed speed deviation is maintained between the actual speed TSA and command speed VCMD.

Figure 10:
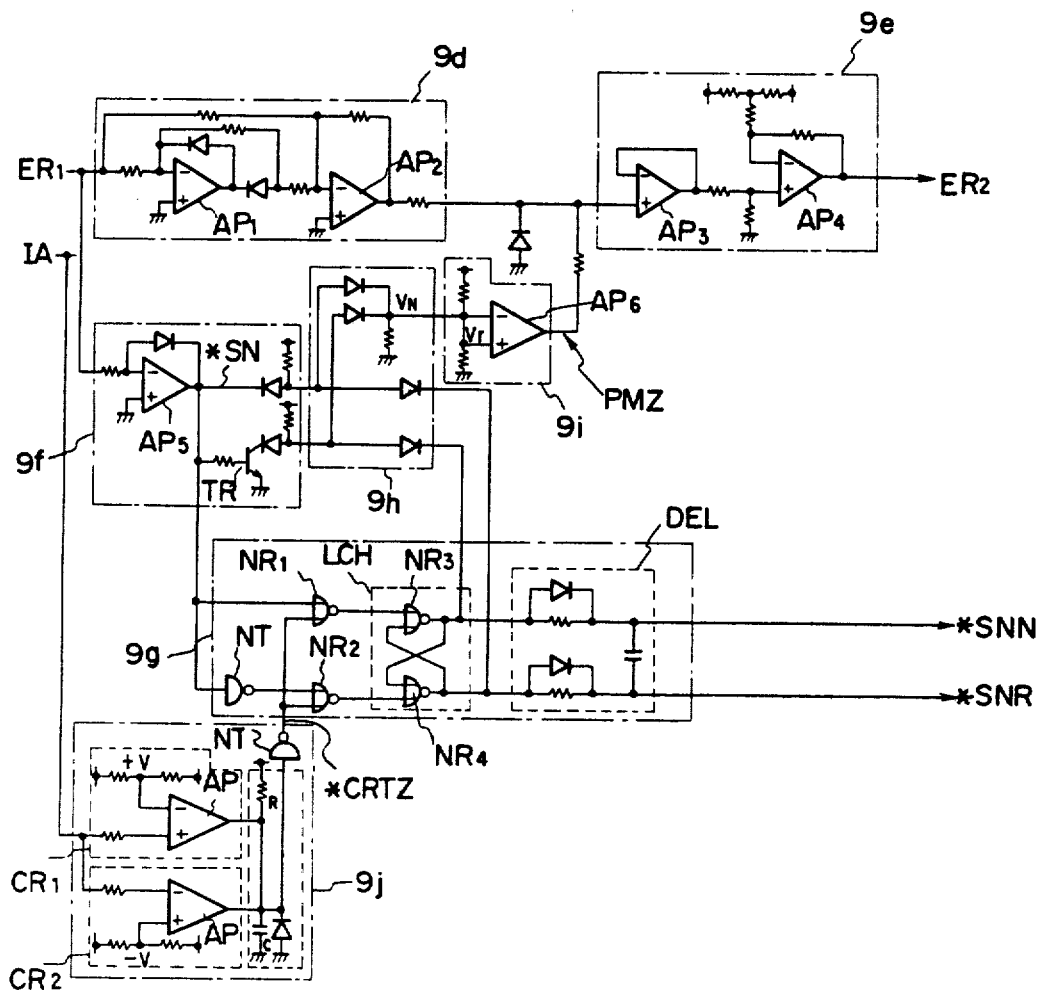
FIG. 10 is a circuit diagram showing another embodiment of a DC motor drive circuit according to the present invention.

FIG. 10 is a circuit diagram illustrating another embodiment of a speed control circuit and is identical with the arrangement of FIG. 8 except for the following three points:
(1) current intermittence detecting circuit 9j does not count the number of times the armature current becomes intermittent.
(2) direction conversion detecting circuit 9h is composed of charge and discharge circuitry and is adapted to actuate phase narrowing circuit 9i for a prescribed period, namely for an interval of 10 msec. (corresponding to the time in which three firing pulses are generated) which begins once the speed deviation signal $ER_1$ has returned from negative to positive polarity; and
(3) current intermittence detecting circuit 9j is adapted such that its output *CRTZ goes to logic "1" as soon as the polarity of the armature current Ia changes from positive to zero or negative, and then back to logic "0" 10 msec. after the armature current polarity has changed from negative to zero or positive. The associated timing chart is shown in FIG. 11.

In FIG. 10 the absolute value circuit 9d is shown to be composed of two differential amplifiers $AP_1$, $AP_2$. The level shifting circuit 9e is composed of analog amplifiers $AP_3$, $AP_4$ and is responsive to the phase narrowing command PMZ to shift the level of the final speed deviation $ER_2$. The direction discrimination circuit 9f includes differential amplifier $AP_5$ and produces the direction signal *SN in accordance with the polarity of $ER_1$. The direction latch circuit 9g is composed of a latch circuit LCH comprising NOR gates $NR_1$, $NR_2$, a NOT gate NT, NOR gates $NR_3$, $NR_4$, and a delay circuit DEL, wherein the latch circuit LCH stores the polarity of the speed deviation signal $ER_1$ and the delay circuit DEL provides the firing control signals *SNN, *SNR. The direction conversion detecting circuit 9h acts as a phase narrowing period detector whose voltage $V_N$ varies in accordance with the direction signal *SN, and the outputs of the latch circuit LCH. The phase narrowing circuit 9i comprises a comparator which compares the voltage $V_N$ with a reference voltage Vr and then produces the phase narrowing signal PMZ based on the results of the comparison. The current intermittence detecting circuit 9j is constructed of two comparators $CR_1$, $CR_2$, a charge and discharge circuit CDC comprising C and R, and a NOT gate NT.

Figure 11:
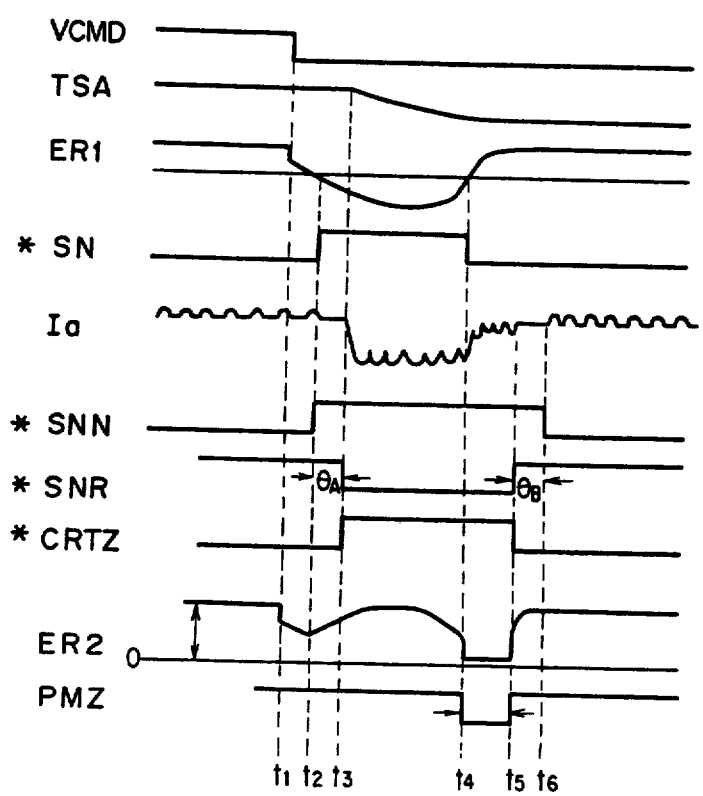
FIG. 11 is a diagram showing the waveforms associated with the circuit of FIG. 10.

In FIG. 11, the voltage $V_N$ of the direction conversion detection circuit 9h turns to high level at time $t_4$ when the output signal *SN from the direction discrimination circuit 9f goes to logic "0". Since the voltage VN is greater than the reference voltage Vr, the phase narrowing signal PMZ from the phase narrowing circuit 9i goes to logic "0" and the final speed deviation signal $ER_2$ is reduced. When $ER_2$ has been reduced and the firing phase narrowed, the armature current Ia decreases. Then, when capacitor C of the current intermittence detector 9j has charged completely, namely at time $t_5$ which follows $t_4$ by a prescribed period, the phase narrowing signal PMZ goes to logic "1" and the intermittent current detection signal *CRTZ goes to logic "0". The *CRTZ signal is applied to the direction latch circuit 9g whose firing control signal *SNR goes to logic "1". The signal *SNN then goes to logic "0" after the lapse of the gate blocking interval $\theta_B$ decided by the delay circuit DEL, thereby effecting release from the gate blocking operation. This permits a transition to the power rectification mode which relies upon the forward thyristor-controlled converter 2.

Figure 12:
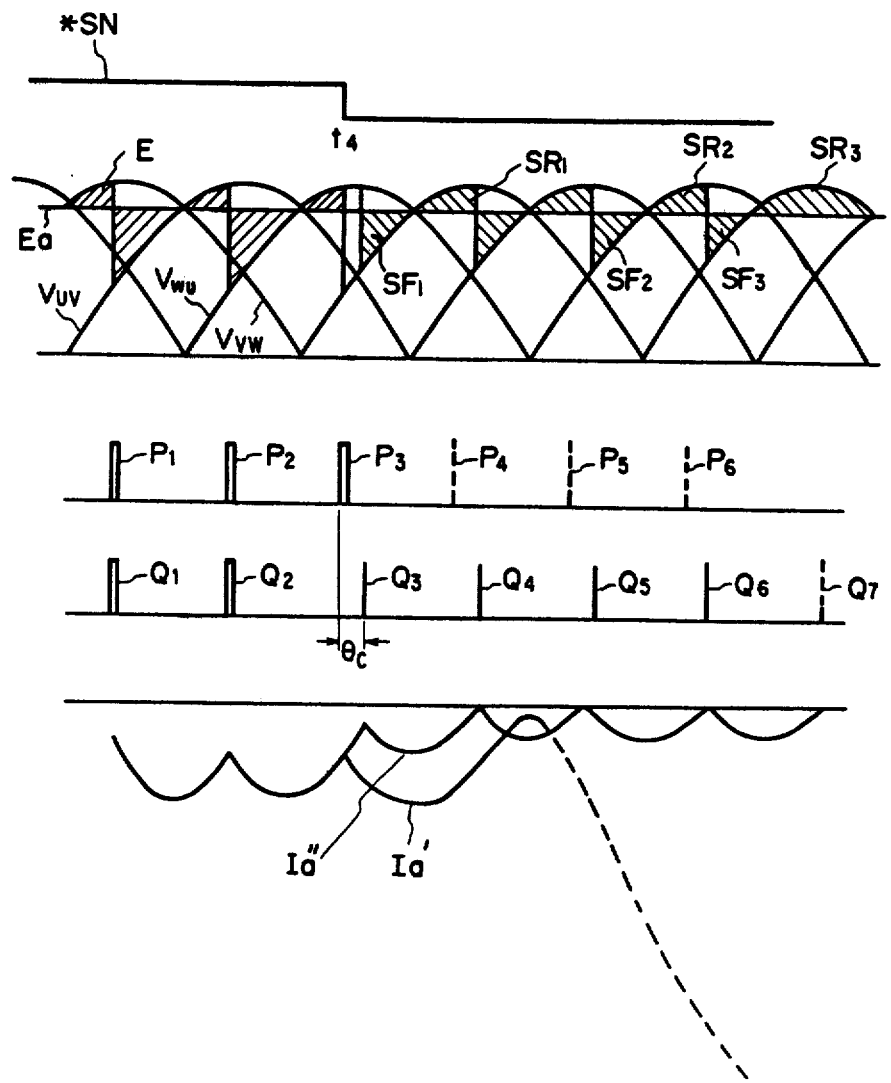
FIG. 12 is a waveform diagram useful in explaining the commutation state when the operating mode is changed.

Reference will now be had to the waveforms of FIG. 12 in order to describe commutation at the time of change of operating mode as practiced in the prior art and in the present invention. *SN, the direction signal delivered by the direction discrimination circuit 9f, goes to logic "0" at time $t_4$ owing to the change in the polarity of the speed deviation signal. Ea denotes the armature voltage, $V_{UV}$, $V_{VW}$ and $V_{WU}$ denote the three phase voltages, E (hatched portion) designates the voltage applied to the armature, $SF_1$ through $SF_3$ (hatched portions) denote the voltage components that increase the braking current, and $SR_1$ through $SR_3$ (hatched portions) the voltage components for suppressing the braking current. The pulses $P_1$ through $P_6$ are firing pulses employed in the conventional circuitry, while the pulses $Q_1$ through $Q_7$ are those used in the present invention. In addition, Ia' and Ia" designate braking current waveforms according to the conventional circuitry and the present invention, respectively.

From the waveforms of FIG. 12 it can be seen that, according to the present invention, the phase of firing pulse $Q_3$ is delayed for an interval $\theta_C$ owing to the firing phase narrowing action of the phase narrowing circuit 9i (FIG. 8) when signal *SN goes to logic "0" at time $t_4$. As a result of the delay, the inequality area $SF_i \leq$ area $SR_i$ will hold thereafter so that the current Ia" is rendered intermittent. The gate blocking action then takes effect after the intermittence of the current Ia" has been detected for a period of three firing pulses. In other words, the firing pulse $Q_7$ is not permitted to be applied to the thyristor-controlled converters, an action wich prevents commutation failure. This is in contrast to the prior art circuitry wherein commutation failure does occur because area $SF_i \leq$ area $SR_i$ cannot be satisfied owing to the inadequate narrowing of phase. Even if a phase narrowing action is applied, the commutation failure may still occur because no provision is made for detecting whether or not the current Ia" has truly reached zero. Moreover, since the conventional circuitry adopts a large firing angle at the time of operating mode conversion, a large regenerative braking current flows into the DC motor even in response to a command for a very small decrease in motor speed. Hunting will therefore occur about the center of a new command speed and make it difficult to stabilize the speed. The drive circuit of the present invention avoids this by gradually lowering the motor speed down to the new command speed in a smooth manner.

From the foregoing it can be understood that the present invention not only enables reliable commutation but at the same time allows a permanent magnet-type DC motor to respond smoothly to a change in command speed. This is made possible in a region of high motor speed when a change-over is made from the power inversion mode to the power rectification mode of operation in a thyristor-controlled three-phase full-wave reversible bridge system and used to drive the DC motor.

What we claim is:
1. A DC motor drive circuit comprising
speed command means for generating a command speed signal;
speed detection means for detecting the actual speed of a DC motor;
a thyristor-controlled full-wave reversible bridge including means, when in a power rectification mode, for converting an AC voltage from a power source to a DC voltage and for applying the DC voltage to the DC motor and, when in a power inversion mode, for feeding the DC motor armature current as AC power back to the power source; and control means for controlling the firing angle of the thyristors of said bridge so that a speed deviation signal corresponding to the difference between the command speed signal and the detected actual DC motor speed is made to approach a predetermined difference, and for shifting the operating mode of said bridge from the power rectification mode to the power inversion mode when the command speed undergoes an abrupt decrease in absolute value, and then back to the power rectification mode from the power inversion mode so that the DC motor will rotate at said predetermined difference from the command speed, said control means further comprising:

polarity discrimination means for detecting a change in the polarity of the speed deviation signal after said bridge has switched to said power inversion mode after said abrupt decrease of the command speed;

firing angle narrowing means responsive to said detected change in polarity of the speed deviation signal for narrowing the firing angle of said thyristors down to a reduced angle when said bridge is operating in the power inversion mode before changing back from the inversion mode to the rectification mode, said reduced firing angle being such as to ensure that the current through said motor is intermittently interrupted;

current intermittence detection means for detecting at least the first said interruption of the DC motor armature current after the operation of said firing angle narrowing means, and for generating a signal indicative thereof, the generation of said signal taking place after the occurrence of a predetermined condition after said detection of the first interruption of the DC motor armature current;

blocking means for blocking the firing of said thyristor bridge circuit for a prescribed period of time after the third of said three firing pulses has been generated; and means for changing over the operating mode of said thyristor bridge from said inversion to said rectification mode after the occurrence of said predetermined condition.

2. The circuit of claim 1 wherein said DC motor is a permanent magnet-type DC motor.

3. The circuit of claim 1,
said firing angle narrowing means comprising a firing angle narrowing circuit for producing a firing angle narrowing command signal in response to said detecting of said change in the polarity of the speed deviation signal of said bridge in the inversion mode,
a shifting circuit for reducing the level of the speed deviation signal in response to said firing angle narrowing command signal, and
means for utilizing said reduced speed deviation signal to produce said reduced firing angle.

4. The circuit of claim 1, said current intermittence detection means comprising means for detecting a predetermined number of the interruptions of the DC motor armature current after said detection of said first interruption.

5. The circuit of claim 4, said AC source having N phases and said predetermined number of current interruptions being equal to N−1.

6. The circuit of claim 1, said predetermined condition comprising waiting a predetermined period of time after the detection of said first current interruption.

7. The circuit of claim 6, said AC source having N phases, and said predetermined period of time corresponding to one cycle of said N phases.

8. The circuit of claim 5 or 7, comprising N=3.

9. The circuit of claim 1, 3, 4, 5 or 7, said reduced firing angle being a predetermined minimum firing angle.

10. The circuit of claim 3, said current intermittence detection means comprising means for detecting a predetermined number of the interruptions of the DC motor armature current after said detection of said first interruption.

11. The circuit of claim 10, said AC source having N phases, and said predetermined number of current interruptions being equal to N−1.

12. The circuit of claim 3, said predetermined condition comprising waiting a predetermined period of time after the detection of said first current interruption.

13. The circuit of claim 12, said AC source having N phases, and said predetermined period of time corresponding to one cycle of said N phases.

* * * * *